United States Patent [19]

Guppy

[11] 3,823,263

[45] July 9, 1974

[54] CAMERA TUBE GAIN CONTROL CIRCUIT

[75] Inventor: John R. Guppy, Hitchin, England

[73] Assignee: British Aircraft Corporation, London, England

[22] Filed: Jan. 26, 1973

[21] Appl. No.: 327,203

[30] Foreign Application Priority Data

Jan. 27, 1972 Great Britain ..................... 3953/72

[52] U.S. Cl. .......................... 178/7.2, 178/DIG. 29

[51] Int. Cl. ............................................ H04n 5/34

[58] Field of Search ............... 178/7.1, 7.2, DIG. 29

[56] References Cited

UNITED STATES PATENTS 3,651,255 2/1970 Kubota et al. ............... 178/DIG. 29

*Primary Examiner*—Robert L. Richardson

*Attorney, Agent, or Firm*—Kemon, Palmer & Estabrook

[57] ABSTRACT

In an electronic camera tube circuit, a gain-control voltage is produced which varies with the level of the video signals corresponding to the background in the viewed scene. An integrator receives a steady input signal as long as the video signal from the camera exceeds the level of the integrator output. The integrator output thus rises to the background level and is sampled and reset periodically, for example at the end of each frame, the sample providing a gain-control voltage.

5 Claims, 1 Drawing Figure

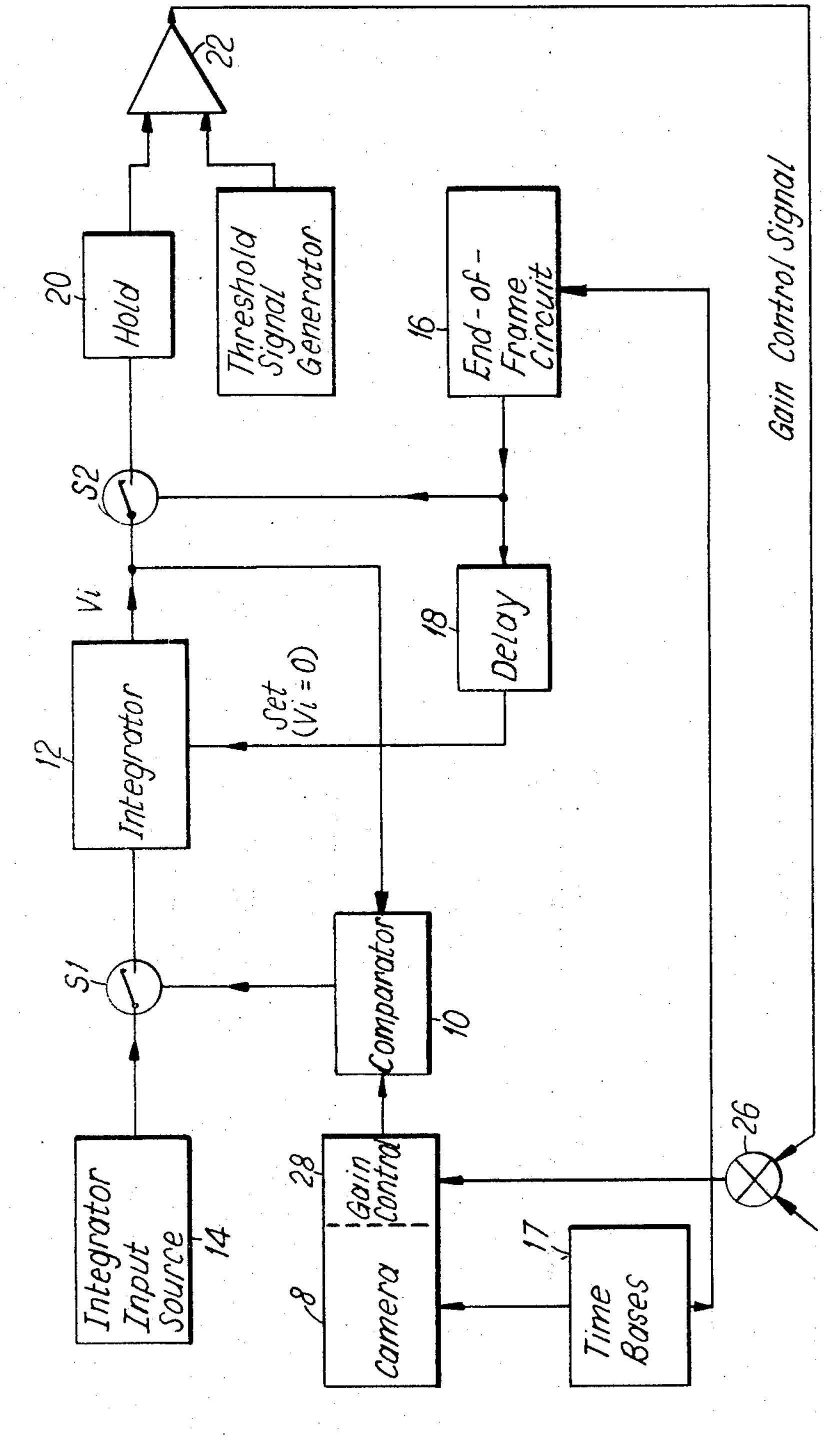
Integrator Input Source
14
S1
Integrator
12
Vi
S2
Hold
20
22
Threshold Signal Generator
End-of-Frame Circuit
16
Delay
18
Set (Vi = 0)
Comparator
10
Camera
8
Gain Control
28
Time Bases
17
26
Gain Control Signal

CAMERA TUBE GAIN CONTROL CIRCUIT

In an image receiver employing a camera of the raster-scanning kind for examining a scene which may consist of a small bright spot (produced for example by a missile flare) against a bright background, it is desirable to provide gain control to prevent the video signals corresponding to the background from rising above a preset threshold level.

An image receiver embodying the present invention further includes a signal generator for generating a reference signal, a comparator connected to compare a video signal derived from the camera with the reference signal from the signal generator, means responsive to the comparator output when the video signal exceeds the reference signal level to increase progressively the level of the reference signal for the period that the video signal exceeds the level of the reference signal, and gain control means controlling the gain of the image receiver as a function of the output level of the reference signal generator.

In the preferred form, the signal generator is in the form of an integrator, the input of which is connected through a switching circuit to an input signal source. The comparator compares the video input signal with the integrator output and renders the switching means conductive to connect the integrator input to the input signal source when the comparator output indicates that the video input signal exceeds the integrator output. A second comparator may be provided for comparing the background level with a reference threshold level, the excess of the integrator output over the reference threshold level determining the gain control signal.

The integrator output may be applied periodically, for example at the end of each frame, to the second comparator and the integrator may then be cleared for the start of the next frame.

In order that the invention may be better understood, one example of a circuit embodying the invention will now be described with reference to the accompanying drawing.

In the drawing, a video input signal $v$ from a vidicon camera tube 8, on the face of which is projected a scene consisting of a small bright spot on a bright background, is applied to one side of a comparator 10, the other side of which receives the output voltage $V_i$ from an integrator 12. The integrator derives its input through a switching circuit S1 for an input signal source 14. At the beginning of each frame the integrator is set so that $V_i$ is zero. When the video input signal exceeds the integrator output, the comparator operates the switching circuit S1 to complete the input circuit for the integrator and the switching circuit remains conductive while the video signal is the greater. Therefore the integrator output increases until it equals the video input signal. The switching circuit S1 is then rendered non-conducting so that the integrator output stays substantially constant unless the video signal level again becomes the greater.

As a consequence, if the scene consists only of the background, the integrator output at the end of the frame represents the background level. The rate of change of integrator output is relatively slow and consequently even in the presence of a bright spot of small area in the scene, the integrator output will not increase to any noticeable extent during the video signal corresponding to the bright spot. In other words, if a video signal is at a high voltage for a long period, the integrator output will run up to the high voltage and then stop. If the peak voltage of the video signal lasts only for a short time, the integrator output will not reach the peak voltage. In this way, the system is able to distinguish between the long and short duration signals which are equivalent to large area backgrounds and small area flare signals respectively and to measure the amplitude of the large area signals.

The integrator is reset at the end of the frame by an end-of-frame signal generator 16, controlled by time base circuits 17, through a delay circuit 18. The end-of-frame signal also operates a switching circuit S2 before the integrator is cleared to connect the integrator output to a "hold" circuit 20 and thence to a differential amplifier 22 which also receives from a threshold signal generator a reference signal representing a predetermined threshold level. If the integrator output is greater than the predetermined threshold level, a signal representing the excess appears at the output of the differential amplifier and is applied to a gain control loop. In the present example, the gain control element 28 is a part of the vidicon camera tube 8. The signal from the differential amplifier 22 is applied to a summing junction 26, at which it may be combined with other gain-control signals, the output of the summing junction being used to vary the target cathode potential of the tube and thereby the gain. Only positive output signals from the differential amplifier are used.

The integrator rate determines the minimum image area that is treated as background by the detector.

The circuit shown allows operation of a missile viewing system at a lower flare-to-background ratio than is possible using flare A.G.C. alone. It also gives better flare-to-background discrimination than simple low-pass filtering of the video waveform. Finally it provides better protection for the vidicon tube.

I claim:

1. An image receiver including a camera of the raster-scanning kind and further comprising:

a signal generator for generating a reference signal;

a comparator connected to compare a video signal derived from said camera with reference signal from the reference signal generator;

means responsive to the comparator output when the video signal exceeds the reference signal level to increase progressively the level of the reference signal for the period that the video signal exceeds this level;

and gain-control means controlling the gain of the image receiver as a function of the output level of said reference signal generator.

2. An image receiver including a camera of the raster-scanning kind and further comprising:

an integrator and a circuit for providing an input signal for said integrator;

a comparator connected to compare a video signal derived from the camera with the output of said integrator;

switching means for applying the said integrator input signal to the integrator when the comparator output indicates that the video signal exceeds the integrator output;

a second comparator connected to compare the integrator output with a signal of a reference threshold level;

and gain-control means operative when said second comparator indicates that the integrator output exceeds the reference threshold level to adjust the gain of said image receiver.

3. An image receiver in accordance with claim 2, including means for periodically applying the output of the integrator to the second comparator.

4. An image receiver in accordance with claim 3, including a circuit operative after a delay, following the application of the integrator output to the second comparator, to reset the integrator output to zero.

5. An image receiver in accordance with claim 2, including means for applying the output of the integrator to the second comparator at the end of a scanning period of the camera scanning raster.

* * * * *